Dec. 15, 1964  C. W. TILUS  3,161,755
COOKING RANGE
Filed March 30, 1961  3 Sheets-Sheet 1
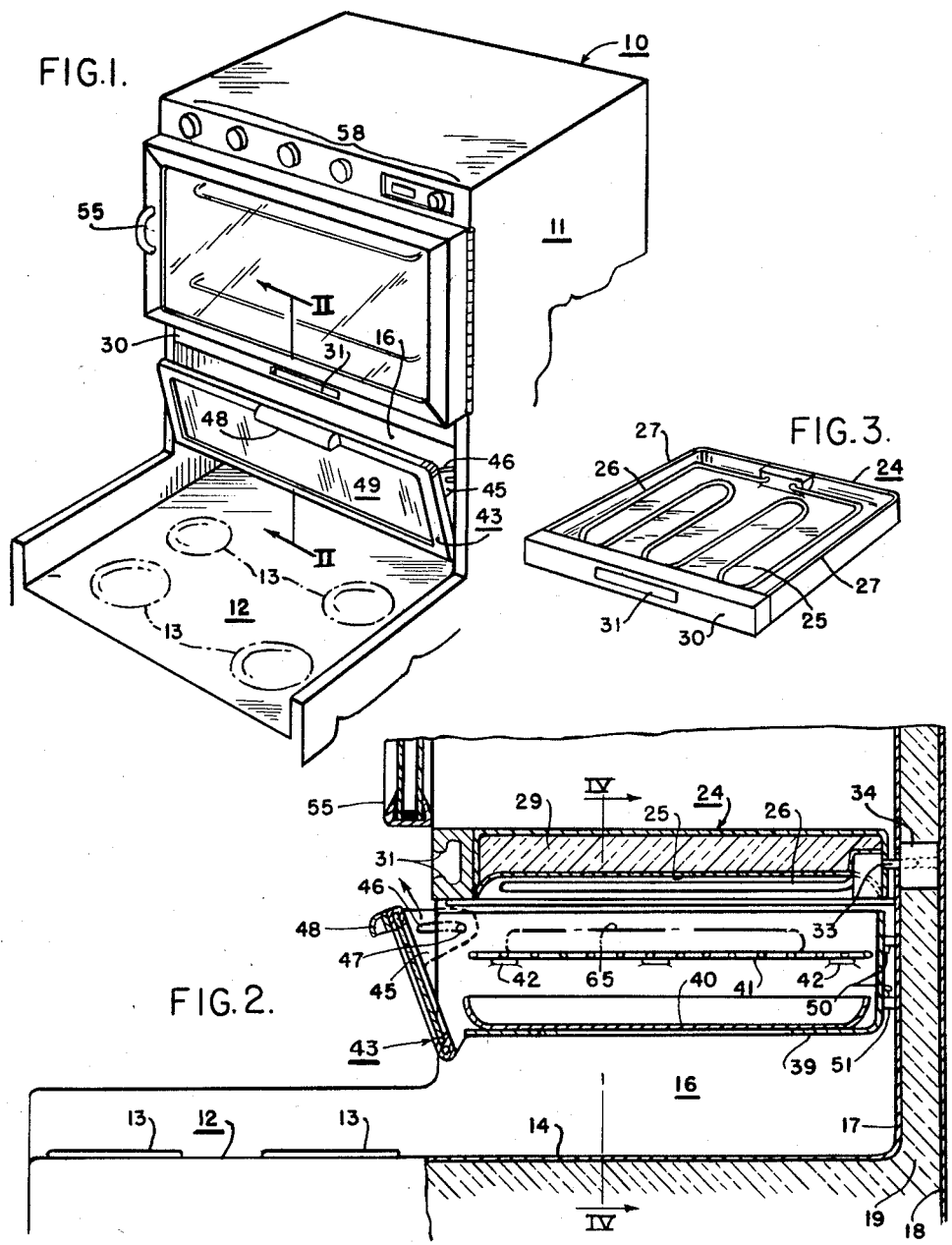
INVENTOR
CARL W. TILUS
BY Ralph T. French
ATTORNEY Dec. 15, 1964   C. W. TILUS   3,161,755
COOKING RANGE Filed March 30, 1961   3 Sheets-Sheet 2

INVENTOR
CARL W. TILUS
BY Ralph T. French
ATTORNEY

Dec. 15, 1964 C. W. TILUS 3,161,755
COOKING RANGE
Filed March 30, 1961 3 Sheets-Sheet 3

INVENTOR
CARL W. TILUS
BY Ralph T. French
ATTORNEY 3,161,755
COOKING RANGE
Carl W. Titus, Mansfield, Ohio, assignor to Westinghouse Electric Corporation, East Pittsburgh, Pa., a corporation of Pennsylvania
Filed Mar. 30, 1961, Ser. No. 99,585
4 Claims. (Cl. 219—403)

This invention relates to ranges, and more particularly to broilers for such ranges.

In the past, broilers having their own heating elements have been supported within the upper portions of the ovens of ranges, requiring the doors of the ovens to be partially open during broiling for preventing the oven thermostats from cycling the heating elements. This has resulted in heat damage to, and staining of, the walls above the ranges, and has required a broiler heating element in addition to the upper and lower oven heating elements.

This invention uses the lower oven heating element of a range as a broiler heating element. In one embodiment of this invention, the oven of a range has an open bottom which is adapted to be closed by a slidably removable heating unit having a tray, heat insulation within the tray, a reflector pan on the insulation, and a heating element within the pan. When the oven is to be used for baking, the heating unit is installed across the bottom of the oven, with its heating element within the oven. The range has a separate slidably removable broiler unit consisting of a tray, a reflector pan within the tray, and a grid within the reflector pan. When broiling is to be done, the broiler unit is installed below the bottom of the oven, the lower oven heating unit is removed, inverted and replaced with its heating element above and facing the broiler pan, and with its tray across the bottom of the oven.

This invention is particularly suited for use with the type of ranges in which the ovens are supported above the level of their surface heating elements, with storage areas below the ovens. The broiler units can be slidably supported in such areas when broiling is to be done, and can afterwards be removed, permitting the areas to be used for storage.

Furthermore, with ranges of this type, where the ovens are above the surface heating elements, it is not practical to have the oven doors mounted for pivotal movement about axes lying along the lower edges of the doors. Instead, the doors of such ovens are usually mounted to swing sideways about vertical axes at a side edge of the doors or to move upwardly on a linkage mounting. With these doors, proper venting of the ovens during conventional broiling cannot be effected by opening the door slightly at the top of the oven. The present invention eliminates this problem.

Among the advantages of this invention are that the broiler unit can readily be removed for cleaning and for permitting the space it occupies to be used for storage; the broiling is done at the lower portion of a range, avoiding heating and staining of the kitchen wall above the range; the range controls are not affected by heat from the lower heating element when it is used for broiling; the broiler front panel can be made of glass for permitting observation of the broiling, and so mounted as to provide the necessary venting, and the number of electric heating elements required for the oven and the broiler of an electric range is reduced.

An object of this invention is to reduce the number of electric heating elements of an electric range.

Another object of this invention is to use the bottom heating element of a range for broiling.

Another object of this invention is to use the area below the oven of a range for broiling.

These and other objects are effected by the invention as will be apparent from the following description taken in connection with the accompanying drawings, forming a part of this application, in which:

FIG. 1 is a perspective view of the upper portion of an electric range embodying this invention;

FIG. 2 is a section along the lines II—II of FIG. 1, showing the lower heating element of the oven in broiling position;

FIG. 3 is a perspective view of the lower heating unit of the oven;

Figure 4:
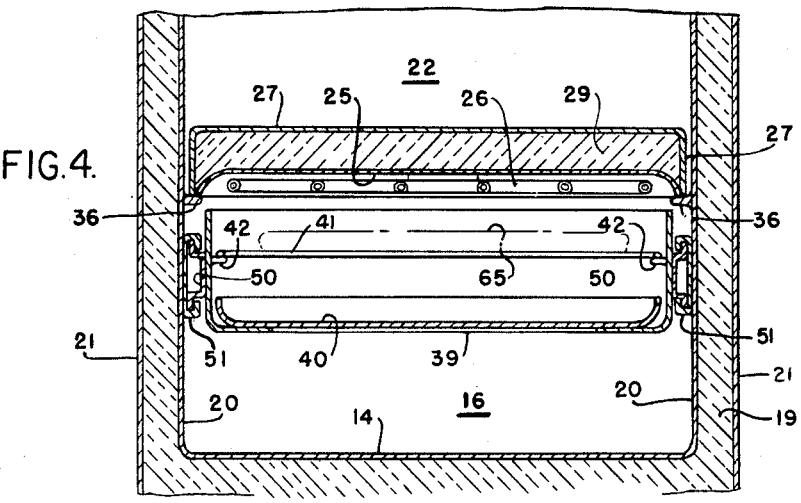
FIG. 4 is a cross-section through the lower portion of the oven, showing its lower heating element in broiling position.
Figure 5:
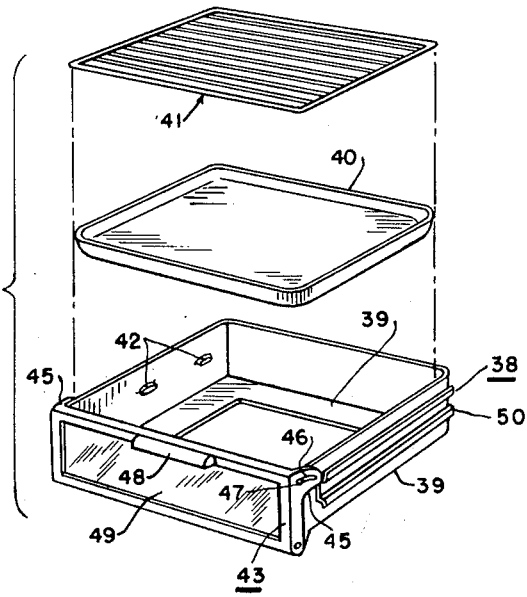
FIG. 5 is an exploded perspective view of the broiler unit of the range.

Referring now to the drawings, an electric range 10 has a cabinet 11 with a horizontal shelf 12 in which are mounted surface electric heating elements 13. Horizontally aligned with the shelf 12 at the back side thereof, is wall 14 of the cabinet forming the floor of a storage area 16. The cabinet has spaced-apart, back walls 17 and 18 with heat insulation 19 therebetween, and has spaced-apart, inner side walls 20 and outer side walls 21 with the insulation 19 between the inner and outer walls. An oven 22 has an open bottom above the storage area 16, and extends between the walls 20. The oven has an upper electric heating element 23 of the usual type. The bottom of the oven is adapted to be closed by a lower heating unit 24 extending across it. The unit 24 consists of a reflector pan 25, an electric heating element 26 within the pan 25, a tray or baffle 27 under the pan 25, heat insulation 29 between the pan 25 and the tray or baffle 27, and a front panel 30 having a hand grip opening 31 formed therein. The heating element 26 has its ends connected to plugs 33 which plug into an electric receptacle 34.

As shown by FIG. 4, the inner side walls 20 have rails 36 attached thereto, and which slidably support the heating unit 24. In FIG. 4, the heating unit 24 is inverted for broiling, and the bottom edges of the side walls of the tray 27 and the pan 25 rest on the rails 36. When the heating unit 24 is in baking position as shown by FIG. 6, the bottom of the tray 27 rests on the rails 36.

A broiler unit 38 consists of a tray 39 having a reflector pan 40 therein, and a grid 41 which rests on flanges 42 which extend inwardly from the sides of the tray 39 above the bottom of the pan 40. The tray 39 has a front door 43 which is pivoted at its bottom to the tray 39, and which has at its sides, inwardly extending flanges 45 with curved slots 46 therein, and into which extend guide pins 47 attached to the tray 39. The door 43 has a glass front panel 49, and a handle 48. The sides of the tray have slide brackets 50 attached thereto, and which are adapted to slide into rail brackets 51 attached to the side walls 20 within the storage area 16.

Figure 6:
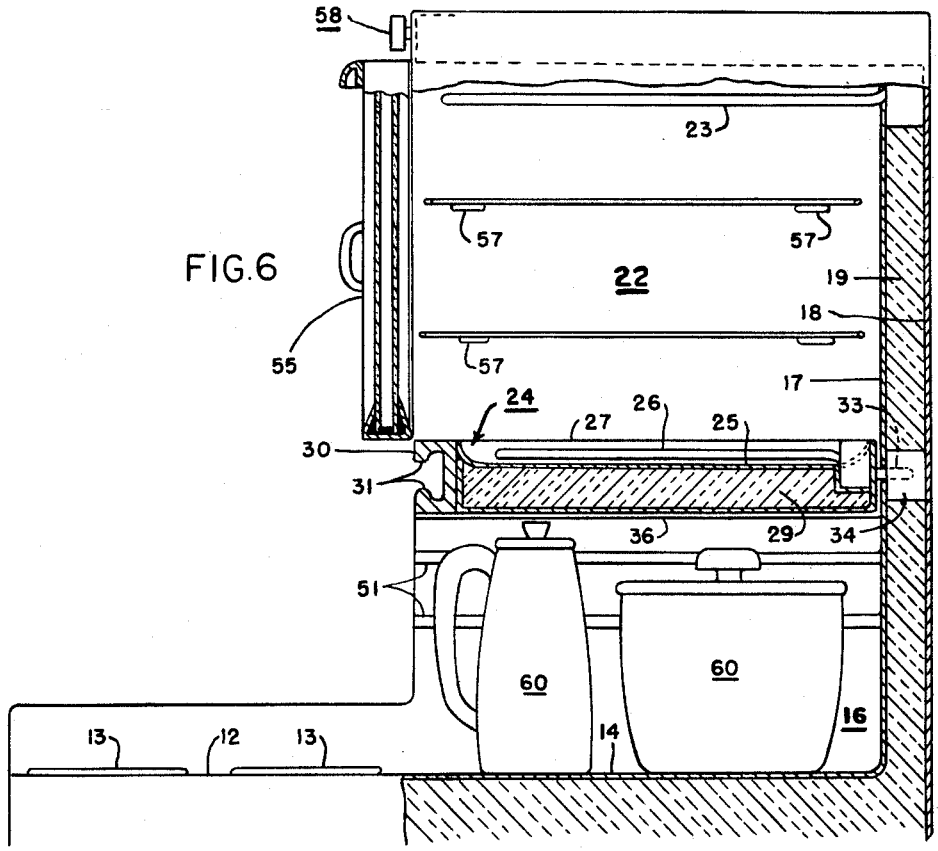
FIG. 6 is a side section of the upper portion of the range, showing the lower heating element of the oven in baking position; showing the broiler unit removed from the storage area under the oven, and showing cooking utensils in the storage area.

When the range is to be used for baking only, the broiler unit 38 can be slidably removed from the storage area 16, and cooking utensils 60 stored in the area 16 as shown by FIG. 6. The heating unit 24 would be positioned as shown by FIG. 6, with the lower heating element 26 and its reflector pan 25 within the oven 22.

When broiling is to be done, any cooking utensils stored within the space 16 are removed, and the broiler unit 38 is placed within the area 16 by placing the slide brackets 50 within the rail brackets 51 and sliding the unit 38 inwardly. The heating unit 24 would be slidably removed from its baking position shown by FIG. 6, inverted, and slidably replaced in the position shown by FIGS. 2 and 4. When the heating unit 24 is slidably removed and replaced, the electric circuit of its heating element 26 is automatically opened and closed, respectively, by the movement of its plugs 33 out of and into, respectively, the receptacle 34.

When the heating unit 24 is in its broiling position, its heating element 26 and its reflector pan 25 are out of the oven 22, the bottom of which is closed by the inverted unit 24, and the heat from the heating element 26 is prevented by the insulation 29 from affecting the oven thermostat. The heat from the heating element 26 and the reflected heat from the reflector pan 25 passes into the broiler unit 38. FIG. 4 shows in dashed lines a steak 65 on the grid 41 of the broiler unit, exposed on its upper side to heat from the element 26 and the pan 25, and exposed on its under side to heat from the reflector pan 40.

While the invention has been illustrated in connection with an electric range, it will be apparent that it may be utilized in gas ranges as well.

While the invention has been shown in but one form, it will be obvious to those skilled in the art that it is not so limited, but is susceptible of various changes and modifications without departing from the spirit thereof.

What is claimed is:

1. In a range, an oven having an open bottom and having a space below said bottom, said range having side walls forming the sides of said oven and said space; a heating unit comprising a tray, heat insulation on the bottom of said tray, a reflector pan on said insulation, a heating element within said pan; means for removably supporting said unit across said bottom with said element within said oven and for removably supporting said unit inverted across said bottom with said element within said space; a broiler unit comprising a tray having an upper open side facing said bottom, and means supporting said last-mentioned tray in said space beneath said inverted heating unit.

2. In an electric range, an oven having an open bottom and having a space below said bottom, said range having side walls forming the sides of said oven and said space; a heating unit comprising a tray, heat insulation on the bottom of said tray, a reflector pan on said insulation, an electric heating element within said pan; means for slidably supporting said unit across said bottom with said element within said oven and for slidably supporting said unit inverted across said bottom with said element in said space; a broiler unit for supporting food to be broiled; and means for slidably supporting said broiler unit within said space in spaced relation to said inverted heating unit.

3. In a range, an oven having an open bottom and having a space below said bottom, a heating unit having a heating element, means for removably supporting said unit across said oven bottom with said element within said oven and for removably supporting said unit inverted with said element in said space, a broiler unit, and means supporting said broiler unit in said space below said inverted heating unit.

4. In a range, an oven having an open bottom and having a space below said bottom, a heating unit having a heating element and a heat baffle, means for slidably supporting said unit across said bottom with said element within said oven and said baffle below said element and for slidably supporting said unit inverted with said element in said space and said baffle above said element, a broiler unit, and means slidably supporting said broiler unit in said space below said inverted heating unit.

References Cited in the file of this patent

UNITED STATES PATENTS

| | | |
|---|---|---|
| 730,252 | Gold | June 9, 1903 |
| 2,110,559 | Smith | Mar. 8, 1938 |
| 2,417,977 | French | Mar. 25, 1947 |
| 2,664,490 | Allgeyer | Dec. 29, 1953 |
| 2,668,221 | McCormick | Feb. 2, 1954 |
| 3,065,326 | Crease et al. | Nov. 20, 1962 |